United States Patent

Arbizzani et al.

[11] Patent Number: 5,174,864
[45] Date of Patent: Dec. 29, 1992

[54] CONTROLLED HEATING UNIT FOR EXTRACTING SOLVENT FROM SLUDGE BY DISTILLATION

[75] Inventors: Tommaso Arbizzani; Gualtiero Ghelardini, both of Pontecchio Marconi, Italy

[73] Assignee: Sodibo S.p.A., Bologna, Italy

[21] Appl. No.: 598,301

[22] Filed: Oct. 16, 1990

[30] Foreign Application Priority Data

Oct. 23, 1989 [IT] Italy ................. 3670 A/89

[51] Int. Cl.⁵ ............................. B01D 3/42
[52] U.S. Cl. .................. 202/175; 202/205; 202/206; 202/233; 202/234; 68/18 R; 159/901; 159/DIG. 26; 203/1; 203/2; 203/3; 203/100; 374/121
[58] Field of Search ............. 202/170, 175, 205, 168, 202/169, 160, 206, 233, 234, 235; 203/100, 1, 2, 3, DIG. 18; 159/DIG. 26, 901, 47.3; 374/131, 179, 121; 68/18 R, 18 C; 134/12, 109

[56] References Cited

U.S. PATENT DOCUMENTS

| | | | |
|---|---|---|---|
| 3,169,537 | 2/1965 | Führing | 68/18 R |
| 3,577,322 | 5/1971 | Nesbitt et al. | 159/DIG. 26 |
| 3,638,018 | 1/1972 | Gasper | 374/121 |
| 3,672,958 | 6/1972 | McCandlish | 202/175 |
| 3,700,565 | 10/1972 | Cornish et al. | 202/206 |
| 3,801,274 | 4/1974 | Gleason | 68/18 C |
| 4,279,704 | 7/1981 | Noble et al. | 202/175 |
| 4,313,786 | 2/1982 | Smith | 159/DIG. 26 |
| 4,313,798 | 2/1982 | Myers | 203/100 |
| 4,652,143 | 3/1987 | Wickersheim et al. | 374/131 |

Primary Examiner—Wilbur Bascomb, Jr.

[57] ABSTRACT

Controlled heating unit for extracting solvent from sludge by distillation, in particular for dry-cleaning machines, having a sludge tank with a flattened shape which is arranged at the base of a sealed box-like chamber and above which inlets for microwaves generated by a microwave source are present, a mixer for the sludge to be treated, at least one sludge temperature sensor which switches off the microwave source when the sludge reaches a temperature which is proximate to the degradation temperature of the solvent.

19 Claims, 2 Drawing Sheets

CONTROLLED HEATING UNIT FOR EXTRACTING SOLVENT FROM SLUDGE BY DISTILLATION

BACKGROUND OF THE INVENTION

The present invention relates to a controlled heating unit for extracting solvent from sludge by distillation, in particular for dry-cleaning machines.

It is known that significant amounts of perchloroethylene are absorbed by the filtration powders during the operating cycle of dry-cleaning machines.

In order to recover the perchloroethylene from the powders, it is known to subject said powders to distillation, but the efficiency of conventional systems leaves solvent residuals in the powders in amounts in the range of even more than 10%.

It is also known that since the solvent does not evaporate at temperatures below 120 degrees and it degrades at temperatures above 150 degrees, the sludge must be heated at temperatures comprised between said two values.

The sludge to be treated also contains other residuals of the washing operation, and the solvent content is such that restrictive laws make the storage and disposal of the solvent residuals not only expensive but sometimes impossible.

The interest in developing a new distillation process which can reduce the perchloroethylene content to such a level as to allow the operator of the washing system to contract companies specialized in the treatment of distillation waste is evident.

SUMMARY OF THE INVENTION

The technical aim of the present invention is indeed to solve the above described problem, i.e. to provide a controlled heating unit which allows the evaporation of the perchloroethylene from the sludge without reaching, at any point, temperatures close to the degradation temperature of the solvent.

Within the scope of this technical aim, an object of the present invention is to provide a simple structure which is relatively easy to execute in practice, is safe in use and effective in operation.

This aim and this object are achieved by the present controlled heating unit for extracting solvent from sludge by distillation, in particular for dry-cleaning machines, characterized in that it comprises a sludge tank with a flattened shape which is arranged at the base of a sealed box-like chamber and above which there are openings for the entry of microwaves generated by a microwave source, a mixer for the sludge to be treated, at least one sludge temperature sensor which drives the microwave source to prevent the sludge from reaching a temperature close to the degradation temperature of the solvent.

BRIEF DESCRIPTION OF THE DRAWINGS

Further peculiarities will become apparent from the detailed description of a preferred but not exclusive embodiment of a controlled heating unit according to the invention, illustrated only by way of non-limitative example in the accompanying drawings, wherein.

DESCRIPTION OF THE PREFERRED EMBODIMENTS

Figure 1:
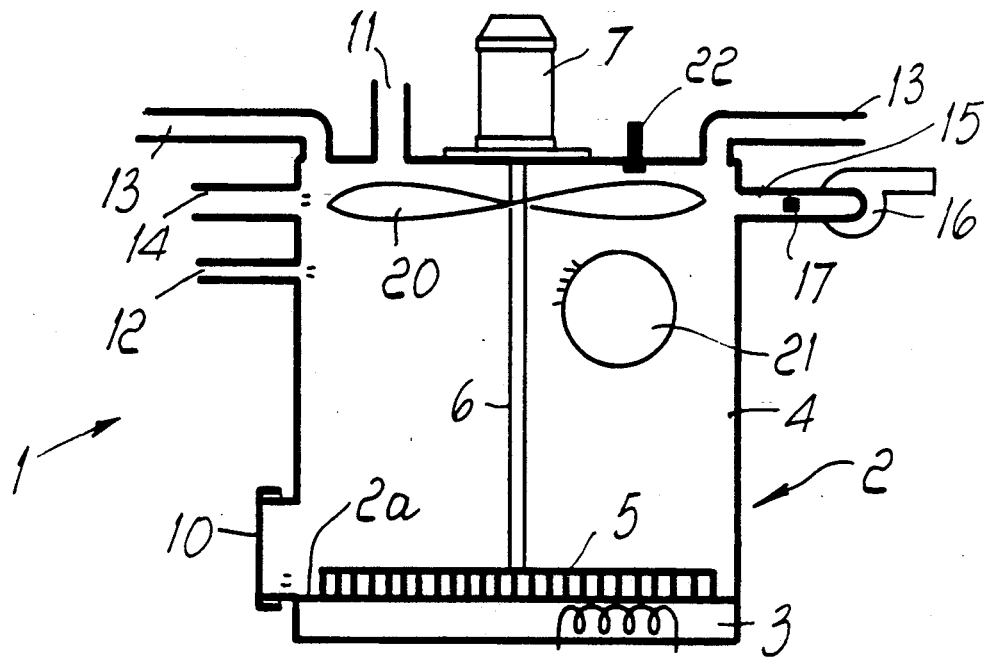
FIG. 1 is a schematic side view of a controlled heating unit for extracting the solvent from sludge by distillation, in particular for dry-cleaning machines.

With particular reference to the above figures, the reference numeral 1 indicates the controlled heating unit for extracting solvent from sludge by distillation, in particular for dry-cleaning machines, according to the invention.

The unit 1 comprises a sludge tank 2 which has a substantially flat bottom 2a, below which conventional resistor heaters 3 are provided.

Figure 2:
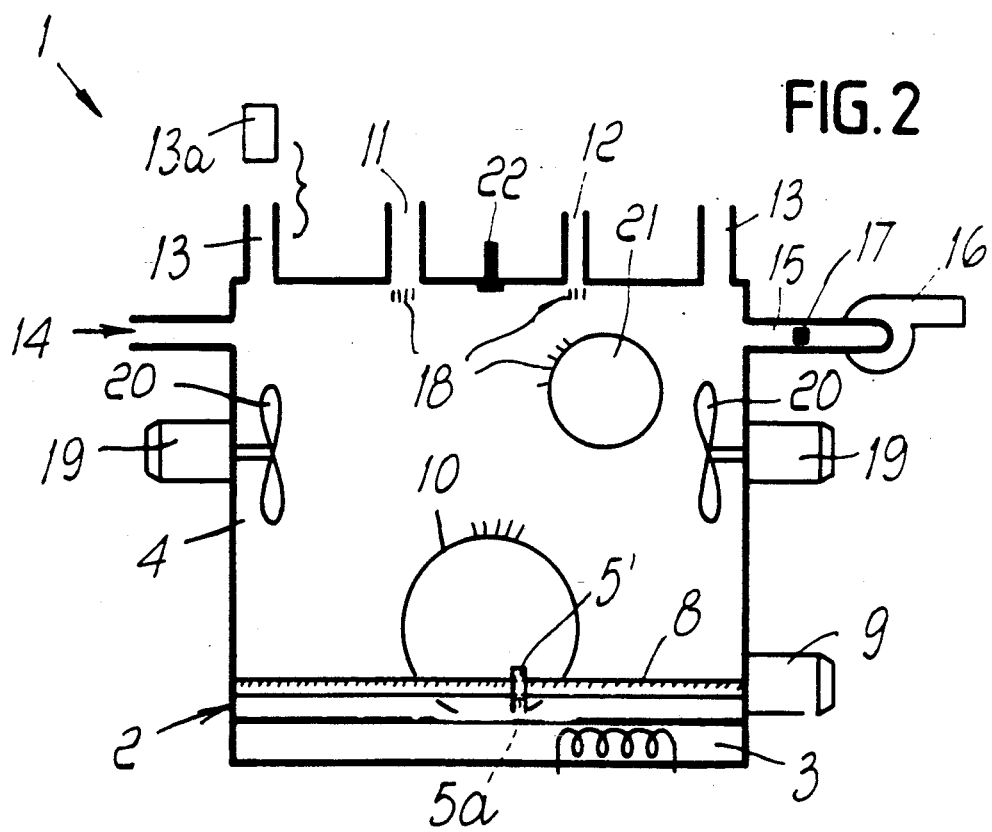
FIG. 2 is a schematic side view of a unit with a tank which differs in shape from the tank of FIG. 1.
Figure 3:
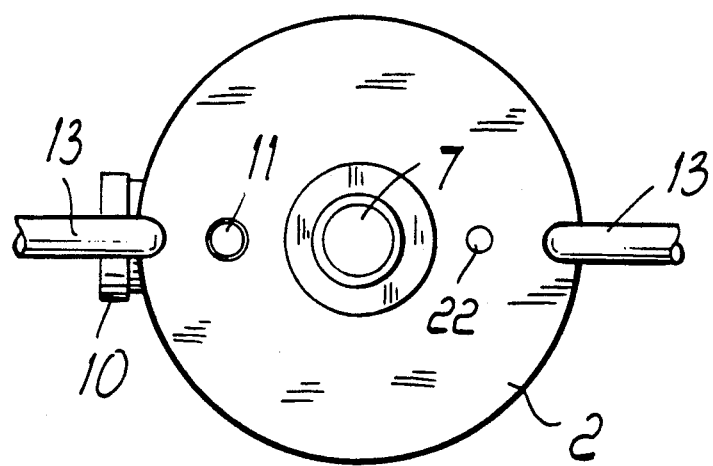
FIG. 3 is a top plan view of the controlled heating unit of FIG. 1.

The tank 2 defines a sealed box-like chamber 4. The chamber 4 and the tank may have a cylindrical shape with a vertical axis, as one illustrated in FIGS. 1 and 3, or a parallelepiped shape illustrated in FIG. 2; the parallelepiped shape of FIG. 2 is provided, in the conventional tanks of known dry-cleaning machines.

A mixer 5 operates in the tank 2, and in the case of a cylindrical tank is constituted by a blade associated below a vertical axial shaft 6 actuated by a gearmotor unit 7 which is fixed centrally to the ceiling of the chamber 4.

In the case of a parallelepiped tank, the mixer 5' is instead constituted by a transverse paddle actuated back and forth along the tank by a threaded shaft 8 which is actuated in one direction or in the opposite one by a gearmotor unit 9 with a horizontal axis; the threaded shaft 8 meshes with an internally threaded bush 5a which is arranged centrally to the paddle. By virtue of the fact that the threaded bush is connected to said transverse paddle and engages said threaded shaft in screw thread engagement therewith, rotational motion of the threaded shaft is converted into linear motion of the transverse paddle.

A removable door 10 for the removal of the powders and for the cleaning or maintenance of the inside of the tank is provided at the base of the chamber.

An inlet 11 for the sludge to be treated, an inlet 12 for the solvent to be distilled, one or more inlets 13 for the radiofrequency energy (microwaves) generated by a microwave source schematically illustrated in FIG. 2, an air inlet 14 and at least one outlet 15 for the air-solvent mixture are provided in the upper region of the chamber 4; a fan 16 and a solvent concentration and/or flow-rate sensor 17, suitable for driving the radiofrequency source to stop the distillation process when the concentration or amount of solvent present is below preset values, operate along said outlet 15. A suction pump may also be provided at the outlet 15.

Said inlets and outlets are shielded with conventional radiation shielding devices 18.

In order to improve the distribution of the radiofrequencies in the chamber, a slowly rotating movable reflecting screen 20 is rotated inside said chamber by means of an external motor 19 (or by means of the previously described central motor 7).

A shielded window 21 for inspecting the inside of the chamber during the process is also arranged in the upper part of the chamber.

At least one temperature sensor 22 is arranged inside the chamber (and in particular in the ceiling or in the tank 2, depending on the device which is provided) and drives the radiofrequency source in that it cuts off the power supply if the temperature of some point is higher than the degradation value of the solvent.

The sensor 22 can be constituted by pyrometers or thermocouples or optical fibers, and can have a plurality of temperature sensing elements arranged in the points in the unit which are expected to possibly reach temperatures higher than the allowed value.

The operation of the unit according to the invention is as follows: by means of the resistor heaters 3, the tank is raised to a temperature which is close to the evaporation temperature of the solvent; the radiofrequency source is then powered so as to strike with microwaves the layer of sludge which is present in the tank, which may even have a significant thickness.

The heating of the content of the tank occurs simultaneously with its mixing by means of the paddle 5 and simultaneously with the distribution of radiofrequency energy obtained by the screen 20.

The temperature sensing devices check the heating, preventing the temperature in some points from reaching values proximate to the degradation temperature of the solvent.

When the sensor 17 senses that the solvent is present in amounts lower than the required value, the process is interrupted.

It has thus been observed that the invention achieves the intended aim and object.

The invention thus conceived is susceptible to numerous modifications and variations, all of which are within the scope of the inventive concept.

All the details may furthermore be replaced with other technically equivalent ones.

In practice, the materials employed, as well as the shapes and dimensions, may be any according to the requirements without thereby abandoning the scope of the protection of the following claims.

We claim:

1. A controlled heating unit for extracting a solvent, having a degradation temperature and an evaporation temperature, from a sludge consisting of the solvent and filtration powders, said controlled heating unit comprising:
   a tank having a flat bottom;
   heating means for heating said tank to a temperature close to said evaporation temperature of said solvent;
   a chamber defined within said tank;
   at least one radio frequency energy source for generating microwaves;
   at least one inlet provided in said tank for permitting microwaves generated by said radio frequency energy source to enter said chamber;
   at least one mixer located inside said chamber for mixing said sludge, and;
   temperature sensor means located inside said chamber for sensing the temperature of said sludge, said radio frequency energy source being disactivatable by said sensor means before said sludge reaches said degradation temperature of said solvent, said heating means, said radio frequency energy source and said mixer being simultaneously operative.

2. A controlled heating unit according to claim 1, further comprising;
   an upper region defined by said chamber;
   at least one air-solvent mixture outlet provided at said upper region of said chamber;
   at lest one fan located at said air-solvent mixture outlet, and;
   at least one solvent sensor driving said radio frequency energy source and being located in said air-solvent mixture outlet proximate to said fan.

3. A controlled heating unit according to claim 2, wherein said solvent sensor comprises a solvent concentration sensor.

4. A controlled heating unit according to claim 2, wherein said solvent sensor comprises a flow-rate sensor.

5. A controlled heating unit according to claim 2, wherein said solvent sensor comprises a solvent concentration sensor and a flow rate sensor.

6. A controlled heating unit according to claim 1, further comprising:
   at least one reflecting screen located inside said chamber, and;
   at least one motor located externally of said chamber and driving said reflecting screen, whereby to improve distribution of said microwaves.

7. A controlled heating unit according to claim 1, wherein said heating means comprise electrical resistance heating means, and wherein said temperature sensor means comprise at least one pyrometer.

8. A controlled heating unit according to claim 1, wherein said tank has a cylindrical configuration, wherein said chamber defines a ceiling, and wherein said mixer comprises;
   at least one gearmotor fixed centrally to said ceiling of said chamber;
   at least one vertical shaft driven by said gearmotor, and;
   at least one blade connected to said vertical shaft.

9. A controlled heating unit according to claim 1, wherein said tank has a parallelepiped configuration, and wherein said mixer comprises;
   at least one gearmotor fixed to said tank;
   at least one horizontal threaded shaft rotatively driven by said gearmotor;
   at least one transverse paddle located in said chamber, and;
   at least one threaded bush connected to said transverse paddle and engaging said threaded shaft in screw thread engagement therewith; whereby rotational motion of said threaded shaft is converted into linear motion of said transverse paddle.

10. A controlled heating unit for extracting a solvent, having a degradation temperature and an evaporation temperature, from a sludge consisting of said solvent and filtration powders, said controlled heating unit comprising;
    a tank having a flat bottom;
    heating means for heating said tank to a temperature close to said evaporation temperature of said solvent;
    a chamber defined within said tank;
    at least one radio frequency energy source for generating microwaves;
    at least one inlet provided in said tank for permitting microwaves generated by said radio frequency energy source to enter said chamber;
    at lest one mixer located inside said chamber for mixing said sludge, and;
    temperature sensor means located inside said chamber for sensing the temperature of said sludge; said controlled heating unit further comprising;
    an upper region defined by said chamber;
    at least one air-solvent mixture outlet provided at said upper region of said chamber;

at least one fan located at said air-solvent mixture outlet, and;

at least one solvent sensor for driving said radio frequency energy source being located in said air-solvent mixture outlet proximate to said fan.

11. A controlled heating unit according to claim 10, further comprising:

at least one reflecting screen located inside said chamber, and;

at least one motor located externally of said chamber and driving said reflecting screen, whereby to improve distribution of said microwaves.

12. A controlled heating unit according to claim 10, wherein said tank has a cylindrical configuration, wherein said chamber defines a ceiling, and wherein said mixer comprises;

at least one gearmotor fixed centrally to said ceiling of said chamber;

at least one vertical shaft driven by said gearmotor, and;

at least one blade connected to said vertical shaft.

13. A controlled heating unit according to claim 10, wherein said tank has a parallelepiped configuration, and wherein said mixer comprises;

at least one gearmotor fixed to said tank;

at least one horizontal threaded shaft rotatively driven by said gearmotor;

at least one transverse paddle located in said chamber, and;

at least one threaded bush connected to said transverse paddle and engaging said threaded shaft in screw thread engagement therewith; whereby rotational motion of said threaded shaft is converted into linear motion of said transverse paddle.

14. A controlled heating unit according to claim 10, wherein said solvent sensor comprises a solvent concentration sensor.

15. A controlled heating unit according to claim 10, wherein said solvent sensor comprises a flow-rate sensor.

16. A controlled heating unit according to claim 10, wherein said solvent sensor comprises a solvent concentration sensor and a flow rate sensor.

17. A controlled heating unit for extracting a solvent, having a degradation temperature and an evaporation temperature, from a sludge consisting of the solvent and filtration powders, said controlled heating unit comprising:

a tank having a flat bottom;

heating means for heating said tank to a temperature close to said evaporation temperature of said solvent;

a chamber defined within said tank;

at least one radio frequency energy source for generating microwaves;

at least one inlet provided in said tank for permitting microwaves generated by said radio frequency energy source to enter said chamber;

at least one mixer located inside said chamber for mixing said sludge, and;

temperature sensor means located inside said chamber for sensing the temperature of said sludge said heating means, said radio frequency energy source and said mixer being simultaneously operative, said controlled heating unit further comprising;

an upper region defined by said chamber;

at least one air-solvent mixture outlet provided at said upper region of said chamber;

at least one fan located at said air-solvent mixture outlet, and;

at least one solvent-sensor driving said radio frequency energy source and being located in said air-solvent mixture outlet proximate to said fan; said controlled heating unit further comprising;

at least one reflecting screen located inside said chamber, and;

at least one motor located externally of said chamber and driving said reflecting screen, whereby to improve distribution of said microwaves.

18. A controlled heating unit according to claim 17, wherein said tank has a cylindrical configuration, wherein said chamber defines a ceiling, and wherein said mixer comprises;

at least one gearmotor fixed centrally to said ceiling of said chamber;

at least one vertical shaft driven by said gearmotor, and;

at least one blade connected to said vertical shaft.

19. A controlled heating unit according to claim 17, wherein said tank has a parallelepiped configuration, and wherein said mixer comprises;

at least one gearmotor fixed to said tank;

at least one horizontal threaded shaft rotatively driven by said gearmotor;

at least one transverse paddle located in said chamber, and;

at least one threaded bush connected to said transverse paddle and engaging said threaded shaft in screw thread engagement therewith; whereby rotational motion of said threaded shaft is converted into linear motion of said transverse paddle.

* * * * *